Patented Nov. 5, 1946

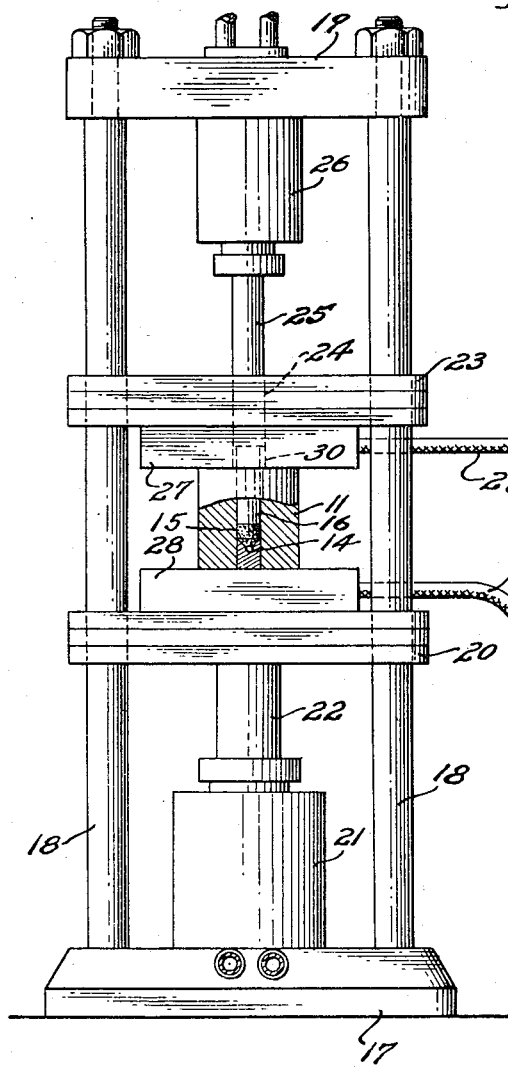
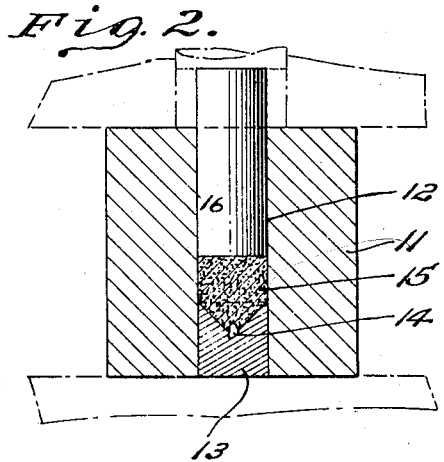
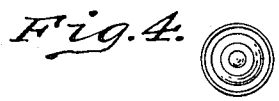

2,410,512

UNITED STATES PATENT OFFICE 2,410,512

DIAMOND TOOL AND METHOD OF MAKING THE SAME

Olof V. Lindqvist and Fred D. Martin, Detroit, Mich., assignors to Koebel Diamond Tool Company, Detroit, Mich., a corporation of Michigan Application March 21, 1942, Serial No. 435,702

6 Claims. (Cl. 76—101)

This invention relates to a new method by means of which diamonds can be set in a metallic substance and has particular application to the manufacture of diamond pointed tools for industrial uses.

The term metallic substance will be used herein to denote a mixture composed of powdered metals or metal alloys. In former methods of setting diamonds in such a metallic substance, a number of separate steps or operations has been required, the common practice being somewhat as follows:

One or several diamonds are placed in a suitable form or mold and the metallic powder is pressed into the mold forming a slug with a diamond or diamonds positioned at the desired points on its surface and/or in its interior. This slug is sintered, forming a solid metallic mass in which the diamonds are embedded. Then the slug is brazed to a suitable tool holder or shank and the complete tool is formed to finished size.

The principal objects of this invention are, first, to provide a method of forming a diamond tool which combines in one operation the separate steps of pressing, sintering, brazing and forming above mentioned, thereby greatly simplifying the production of industrial diamond tools; and, second, to compound a novel type of metallic substance in which the diamond is embedded and further in connection with this object to corrollate the metallic substance so compounded with the method of forming the tool set forth herein.

Another object is to specifically set forth the composition of a novel metallic substance in which powdered iron is used as the principal ingredient. Hitherto, it has been found impractical to employ large quantities of iron as a part of the metallic substance in which diamonds are embedded because of the fact that under the heat applied in the sintering process the iron reacts with the diamond to form iron carbide which not only blackens the surface of the diamond so as to impair its genuine appearance, but also causes a softening of the skin of the diamond and in some cases of even the whole diamond so as to materially reduce the effective cutting as well as wearing properties of the tool.

In the drawing accompanying this specification,

Fig. 1 is a schematic view of a press which has been arranged for forming a diamond tool according to the method of this invention.

Fig. 2 is an enlarged view of that portion of the apparatus shown in Fig. 1 in which the tool is formed.

Fig. 3 is a view of the shank portion of the tool, an end view of which is shown in Fig. 4, and Fig. 5 is a view of a completed diamond pointed tool.

The method of the present invention is based upon the discovery that when a metallic substance in which a diamond is to be embedded is composed of a number of ingredients which have certain relative physical properties, such as will be hereafter set forth, a powdered mixture of these ingredients, under suitable amounts of heat and pressure, can be sintered about a diamond and simultaneously brazed to the shank of a tool holder.

The principal or first essential ingredient of this metallic substance should be some metal which has relatively high properties of strength and hardness. The second essential substance is one having a sintering point lower than the critical temperature above which the quality of the diamond is impaired. The third necessary substance is a brazing agent having a melting point below the sintering temperature of the second substance.

A representative mixture which specifically illustrates the incorporation of ingredients of the above three types is composed of 79% iron, 20% copper and 1% brass. These ingredients are used in the powdered form, preferably finer than 325 mesh, and must be well mixed before being employed in the construction of a diamond tool.

The forming of a tool according to the method of this invention may take place in a suitable graphite mold 11, shown in the enlarged view of Fig. 2 of the drawing to be provided with a cavity 12, the lower end of which is closed by a graphite stopper 13. The inner end of the stopper 13 is formed so as to define the desired configuration of the point of the tool, the particular shape illustrated being adapted to form a conical pointed tool. A diamond 14 is placed within the graphite mold 11 so as to rest upon the inner surface of the stopper 13 where it may be held in position by any suitable adhesive, such as wax or, if desired, may be held in position by vacuum. If the latter method is used, it will, of course, be necessary to provide a hole through the stopper 13 so that suction may be applied. Immediately above the diamond and the stopper, the cavity of the mold is filled with the powdered mixture 15 of the type hereinbefore described and the shank of a tool holder 16 is then placed within the cavity.

With the metallic mixture and method of forming of this invention, a diamond tool may be produced by transforming the diamond 14, the mixture 15 and the tool holder 16 into a single unit in one operation by the simultaneous application of heat and pressure. This application of heat and pressure is regulated so that the powdered mixture, containing the aforementioned three essential elements, is brought to the sintering temperature of the second essential ingredient for the particular amount of pressure applied. This temperature must be above the melting point of the third ingredient so that a brazing of the mixture to the shank of the tool will take place simultaneously with the sintering.

With this explanation of the actions which take place during an application of the method of the present invention, it becomes possible to develop certain general imperical relationships which must exist between the quantities of the three essential ingredients used before satisfactory results can be obtained. In the sintering process which takes place between the first and second ingredients, the first ingredient remains in a solid state and the second ingredient is transformed into a semi fluid state with the result that under the influence of the pressure applied, it is spread throughout the mass of powdered metal so as to fill the interstices between the grains or particles of the first ingredient. No alloy is formed in the proper sense of the term, and therefore if a greater quantity of the second ingredient is used than is needed to fill the interstices between adjacent particles of the first ingredient, the excess will be forced to the outer surface of the mass of powdered metal and in between mold and plunger or tool shank where its presence will make it extremely difficult or even impossible to remove the formed tool from the mold without breaking the latter. If less than a proper amount of the second ingredient is used, it is obvious that the quality of the bond produced by the sintering of the mass of powdered metals will be impaired.

As far as the proper quantity of brazing agent is concerned, since this ingredient is in its fluid state during the application of the heat and pressure, the presence of too great a quantity will result in the occurrence of the same condition as obtains when an excess of the second ingredient is used. We have found, however, that but a very small amount of brazing material is required to produce a satisfactory bond between the mass of powdered metal and the shank of the tool.

Concerning pressure and temperature, as mentioned before, the mixture of powdered materials must be brought to the sintering temperature of the second ingredient for a given pressure condition. Hence temperature is primarily a function of, or is determined by, the physical properties of the sintering agent selected as modified by the amount of pressure applied, since the application of pressure results in a lowering of the sintering temperature. At the same time, the temperature must not be so great that undesirable reactions will take place between the diamond and any of the materials of the mixture. This gives rise to the presence of a third factor—time. If the materials used are such that an unfavorable reaction upon the diamond is possible, there will be an ever present natural tendency for this reaction to occur above a certain temperature, providing sufficient time elapses for its occurrence and therefore, as a general proposition, it may be said that all factors should be correlated so that the sintering and brazing of the mass of powdered metals may take place in a minimum length of time.

To illustrate such a correlation of factors for a satisfactory employment of the method of forming of this invention with the specific mixture of 79% iron, 20% copper and 1% brass (all being used in their commercially obtainable powdered forms), the total heat required is that necessary to bring the temperature of the mold to 1000 degrees centigrade in approximately 45 seconds, during which time a pressure of about 2000 pounds per square inch is applied to the mixture through the tool holder.

To further illustrate this process in terms of a specific form of apparatus which may be used, a suitable press for performing the above mentioned steps is schematically shown in Fig. 1 and consists of a base plate 17 and suitable vertical columns 18 which are connected at the top by a member 19. A lower plate 20 is slidably mounted on the vertical columns 18 and its movement is controlled by a hydraulic cylinder 21 and piston 22 supported by the base plate 17. An upper plate 23 is also mounted upon the vertical columns 18 but in a fixed position. This upper plate 23 is provided with a hole 24 which extends through its center portion in order to permit movement of a piston 25 of a second hydraulic cylinder 26 which is supported by the cross member 19. Upper and lower copper electrodes 27 and 28 are mounted upon the lower and upper surfaces respectively of the plates 23 and 20, these electrodes being equipped with connections 29 for supplying a coolant. The upper electrode 27 has a center hole 30 corresponding to the aforementioned hole 24.

The previously described mold 11, in which the diamond 14, the mixture 15 and the tool holder 16 have been placed, is positioned between the upper and lower electrodes 27 and 28 which are then brought together so as to firmly hold the mold by moving the lower plate 20 upwardly with the aid of the hydraulic cylinder 21 and piston 22. The upper hydraulic cylinder 26 is then operated so that its piston 25 is brought into contact with the upper end of the tool holder 16 until a pressure of about 2000 pounds per square inch is applied to the tool holder. A uniting of the diamond, metal mixture and tool holder will be caused by applying sufficient voltage to the electrodes to raise the heat of the mold 11 to the above mentioned 1000 degrees centigrade in 45 seconds. Suitable instruments, such as an optical pyrometer and electrical controls are preferably employed to check and maintain the temperature during this operation since it is necessary to keep the temperature within rather closely defined limits in order that the forming operation will be successful.

This specific description of the amounts of pressure and temperature used in the forming operation applies when the mixture 15 employed consists of the novel combination of 79% iron, 20% copper and 1% brass. It will of course be understood that the specific proportions hereinbefore set forth are illustrative; in actual practice we have found that satisfactory results can be obtained by varying the proportions of the ingredients within the following limits: copper 15% to 25%, brass 1% to 5% and the remainder iron. When, however, the amount of brass relative to copper and iron is increased, the temperature may be somewhat lowered. During the forming operation the heat and pressure applied to the metallic mixture causes a considerable softening of the copper. In this softened condition the copper, not only penetrates into the interstices between the particles of the iron powder and adheres to the iron, but as the temperature employed is above the critical temperature of the iron, a solution is effected to form a slight film of alloy between the iron and copper particles on their contacting surfaces. The temperature and pressure applied are sufficient to cause a complete melting of the third ingredient or brass so that it flows throughout the entire mixture with a brazing action with the result that not only is an added bond formed between the particles of copper and iron but the entire slug of metallic mixture is brazed to the tool holder. A similar alloying effect to that above referred to between the copper and iron powder also probably occurs between the steel shank and copper of the slug material, the film of alloy serving to form a more intimate bond than secured by a simple brazing effect and thereby materially strengthens the union between the shank and slug.

We claim:

1. A method of forming a diamond tool which consists in placing a diamond in a suitable mold, covering at least a portion of the surface of said diamond with a metallic substance containing substantially 79% iron, 20% copper as a sintering agent and 1% brass as a brazing agent, placing a tool shank in contact with said metallic substance, and heating said metallic substance to the sintering temperature of said sintering agent and above the melting temperature of said brazing agent while simultaneously applying pressure to said metallic substance thereby to compact said powdered substance to form a solid slug in which said diamond is embedded and simultaneously unite said slug to said shank.

2. A cutting tool comprising a shank, a cutting element, and a support for said cutting element in which the latter is embedded, said support comprising a sintered mass containing substantially 79% iron, 20% copper and 1% brass integrally united to said shank.

3. A method of forming a diamond tool which consists in placing a diamond in a suitable mold, covering at least a portion of the surface of said diamond with a metallic substance containing substantially 79% iron, 20% copper and 1% brass, placing a tool shank in contact with said metallic substance, applying sufficient heat to said mold to raise said metallic substance substantially to the sintering temperature of said sintering agent in not more than one minute while simultaneously applying pressure to said metallic substance thereby to compact said powdered substance to form a solid slug in which said diamond is embedded and simultaneously unite said slug to said shank.

4. A method of forming a diamond tool which consists in placing a diamond in a suitable mold, covering at least a portion of the surface of said diamond with a metallic substance containing substantially 79% iron, 20% copper and 1% brass, placing a tool shank in contact with said metallic substance, applying sufficient heat to bring the temperature of said mold to about one thousand degrees centigrade in approximately forty-five seconds while applying a pressure of about two thousand pounds per square inch to said metallic substance through said tool shank thereby to compact said powdered substance to form a solid slug in which said diamond is embedded and simultaneously unite said slug to said shank.

5. The method of manufacturing a diamond tool which comprises setting a diamond in a metallic substance composed of iron, copper and brass powder, the iron constituting the main part of said metallic substance and the brass constituting a small part thereof; heating said metallic substance to a temperature below the melting point of said copper and considerably higher than the melting point of said brass while simultaneously applying pressure to said metallic substance through a steel shank of the tool thereby effecting a sintering of said metallic substance and a simultaneous brazing thereof to said shank.

6. A diamond tool comprising a metallic shank, a slug of sintered material firmly bonded to said shank and a diamond embedded in said slug and exposed on one face thereof for cutting purposes, said sintered material consisting of a mixture of from 15% to 25% copper, 1% to 5% brass and the remainder iron.

OLOF V. LINDQVIST.
FRED D. MARTIN.